June 8, 1926.                  1,588,222
H. D'OLIER, JR
LIGHTING DEVICE
Filed August 17, 1923     2 Sheets-Sheet 1
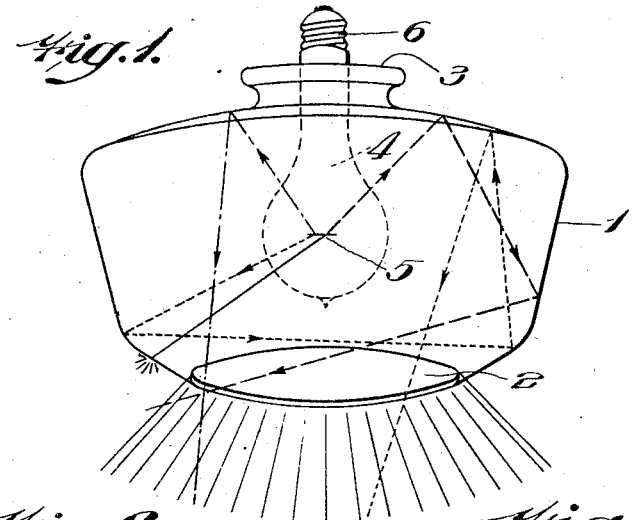
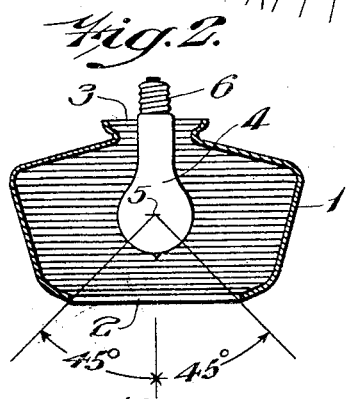 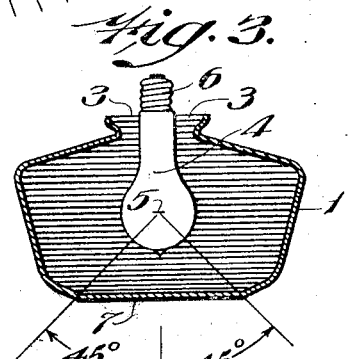
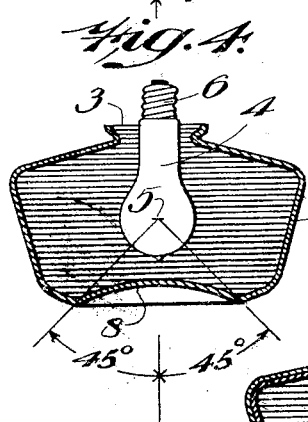 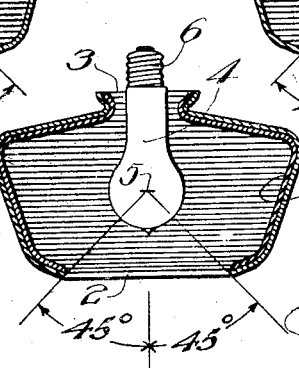
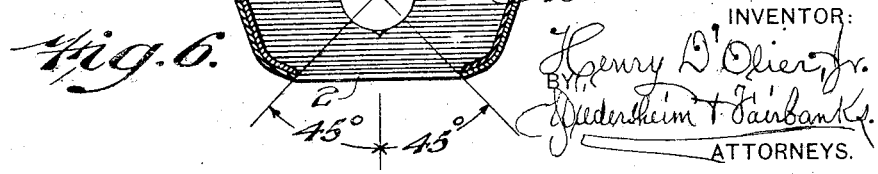
INVENTOR:
Henry D'Olier Jr.
BY
ATTORNEYS.

June 8, 1926.

H. D'OLIER, JR 1,588,222

LIGHTING DEVICE

Filed August 17, 1923   2 Sheets-Sheet 2

KEY
- DIRECT RAYS ─────────
- DIRECT REFLECTION ─·─·─·─
- SECOND REFLECTION ─ ─ ─ ─
- MULTIPLE REFLECTION ········
- DIFFUSED

INVENTOR:
Henry D'Olier, Jr.
BY Niedersheim & Fairbanks
ATTORNEYS

Patented June 8, 1926.

UNITED STATES PATENT OFFICE.

HENRY D'OLIER, JR., OF BRIDGEPORT, CONNECTICUT.

LIGHTING DEVICE.

Application filed August 17, 1923. Serial No. 657,854.

My invention relates in general to the class of overhead lighting fixtures generally made of glass or kindred translucent material, which are usually suspended from a ceiling, are more or less globe-like, open at the bottom to different widths of aperture, and formed with a usually flanged central upper opening through which opening is passed the incandescent lamp or other lighting element.

More specifically recited, my invention relates to a partly inclosing glass globe, or inclosing glass unit, for directing, reflecting and diffusing light rays, when used with an electric incandescent lamp or any other source of light.

The object of my invention as embodied in devices of the foregoing character is to provide an inclosing globe, the contour of which is of such design as to prevent any first reflection or direct image of light source to be visible above the angle of light cut-off, or the cone of direct illumination.

A further object of my invention in the embodiment above indicated, is to have the bottom of the partly enclosed glass either open or as to the same area of opening closed by clear or crystal inclosing glass, either of which constructions will allow all downward and direct light rays within the angle of cut-off or the cone of direct illumination, to pass uninterruptedly.

Another object of the invention is to make the top and sides of the globe of material possessing good reflecting and diffusing qualities, which in conjunction with its contour and angle of cut-off, or the angle of the cone of direct illumination, will give by direct, reflected and transmitted light a maximum uniform intensity on the plane below.

Still another object of my invention is to have the contour and angle of the cone of direct illumination of the globe of such design as to permit of the raising and lowering of the light source within the globe, to decrease or increase the illuminating area without permitting any direct light rays, that is, any first reflected light rays or direct image of light source, to be visible above the angle of cut-off.

A further object of my invention is to so design the contour of the globe and select the component material that all outside surfaces of the glass in the line of vision will be approximately uniform in brightness.

With the foregoing and other objects in view, I have designed a globe of the character referred to, which will possess and employ the various features of advantage enumerated, and which can be manufactured at no greater expense than has heretofore been involved in the making of globes of the same general character.

For the purpose of explaining my invention, I have in the accompanying drawings shown certain typical constructions of it which while organically of the same general contour, illustrate by different lines the direction of the light rays which are symbolized by the "key" drawn on the second sheet of the drawings below Figure 11 of that sheet.

Thus, Figure 1 represents a perspective view of a globe embodying my invention, in a preferred contour.

Figure 2 represents a vertical sectional view of the same, illustrating the basal opening.

Figure 3 represents a vertical section of a modified form of globe embodying my invention, having a plane transparent bottom instead of the basal opening.

Figure 4 represents a vertical section of a modified form of globe embodying my invention having an upwardly concaved transparent bottom.

Figure 5 represents a vertical section of a modified form of globe embodying my invention, having a downwardly concaved transparent bottom.

Figure 6 represents a vertical section of a modified form of globe embodying my invention, having therein a reflecting lining.

Figure 7:
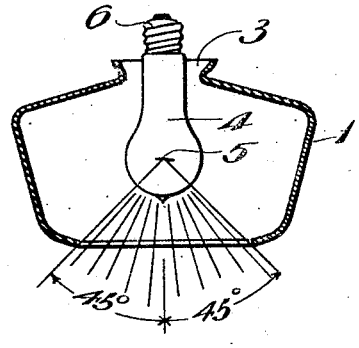
Figure 7 is a vertical section of a globe embodying my invention, having a basal opening therein, similar to that shown in Figures 1 and 2, illustrating diagrammatically the course taken by the direct rays of light emerging through said basal opening, that is, showing the cone of direct illumination.
Figure 8:
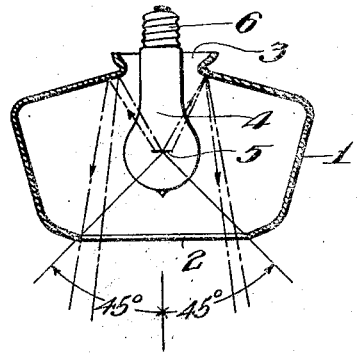
Figure 8 is a similar vertical sectional view illustrating the path taken by the rays after the first reflection within the globe.
Figure 9:
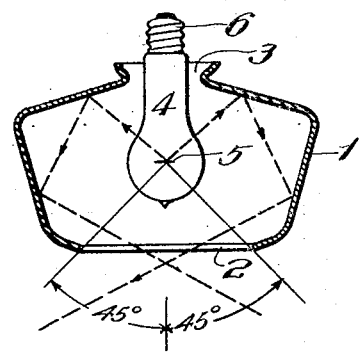
Figure 9 represents a similar vertical sectional view illustrating the path taken by the rays of light after the second reflection within the globe illustrating double reflected rays which emerge through the basal opening.

Referring to the drawings, in which like reference characters indicate like parts, with particular reference to Figure 1, the numeral 1 designates a globe embodying my invention, having a preferred form or contour and the top, side and bottom walls 10, 11 and 12 respectively, and the basal opening 2 in the bottom thereof.

In Figure 1, as well as in the rest of the figures the rays of light are illustrated diagrammatically by five different symbols, a "key" to which is shown at the bottom of the last sheet of drawing. Thus the full lines illustrate the direct rays of light. The rays reflected but once are shown in dot and dash lines. The rays reflected twice are shown by ordinary dotted lines. The rays of multiple reflection, that is, reflected three or more times, are represented by lines of relatively small dashes, while the diffused rays are represented by a symbol of a number of radial lines.

The top opening of the globe, through which extends the electric incandescent bulb, or a kindred source of light, is designated by the numeral 3, while the incandescent light is designated by the numeral 4, and the illuminating center or focus thereof is designated by 5. 6 designates the screw base, or end of the incandescent light. The upper opening 3 of the globe may be surrounded by an outwardly extending flange 13 by which the globe may be supported.

Figure 12:
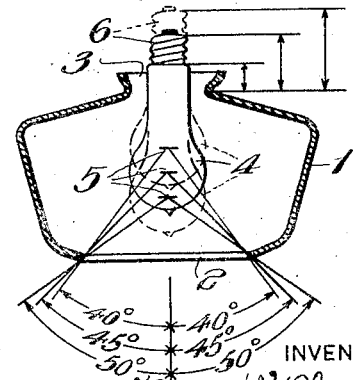
Figure 12 represents a vertical section of a globe, showing a source of light, such as an incandescent bulb, mounted therein at various heights to illustrate the effect of the focus point of the globe on the angle of the cone of direct illumination.

In Figures 1, 2 and 7 to 12 inclusive, is illustrated a modification of my invention embodying a basal opening. In each one of these figures I have shown the cone of direct illumination as being substantially at 45 degrees to either side of the axis of the globe. In Figure 12 I have illustrated the manner in which the cone of direct illumination may be varied, that is, increased or decreased by lowering or raising respectively, the incandescent light or other source of illumination.

While in Figures 1, 2 and 7 to 12 inclusive, I have illustrated a globe with a basal opening, yet, if desired, such basal opening may be replaced or inclosed by a suitable glass panel of crystal glass, or of a perfectly transparent glass, which may be desirable, if for any reason, it is desired to completely inclose the source of incandescent light. Thus, in Figure 3 I have shown a globe with a flat bottom 7 of clear glass, inclosing the basal opening, which is either inserted within the opening or embodied in the casting or formation of the globe as integer thereof.

Similarly, in Figure 3 I have illustrated a globe, similar to that shown in Figure 3, except that the clear bottom panel 8 thereof, instead of being flat, curves or is concaved upwardly into the interior of the globe. Thus also in Figure 5 I have illustrated still a further modification of a globe, having also a bottom 9 of clear, transparent glass, similarly inclosing the basal opening, convexed or bulged outwardly, however, from the bottom wall 12 of said globe.

Figures 7 to 11 inclusive, illustrate the successive series of rays which may result from the source of illumination, the focus of which is designated by 5, to wit, the direct rays, the singly reflected rays, the doubly reflected rays, the multiple reflected rays and also the diffused rays, resulting from the impingement of any one of the former rays upon the inner surface of the globe. In each of these Figures 7 to 11 inclusive, the successive rays illustrated, are shown with reference to the same basal opening and the same position of the focus 5, that is, in such a combination of the basal opening and the focus as will produce the same cone of direct illumination, that is, the cone of ninety degrees, or forty five degrees on either side of the axis of the globe.

Figure 6 illustrates a globe having the same general contour as those in the other figures, in which is included a reflecting lining 14, formed either of translucent or opaque material, which to a certain extent, serves to modify the diffusion of the light.

Figure 10:
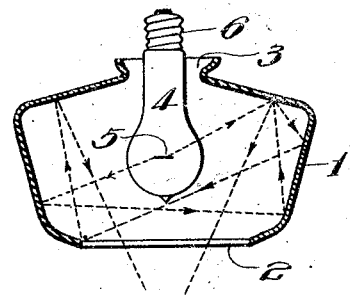
Figure 10 is a similar sectional view illustrating the path of rays which do not emerge from the basal opening after the second reflection, but which are reflected a third time before emerging.
Figure 11:
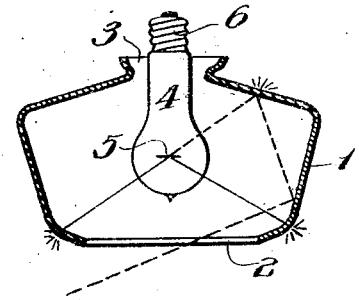
Figure 11 represents a vertical sectional view, similar to that shown in Figure 9, illustrating the combined reflecting and diffusing properties of the globe.

Whether the globe is provided with the basal opening 2 or whether the basal opening is inclosed by means of the plane, concave or convex bottoms 7, 8 or 9 respectively, of clear, transparent glass, the basic effect of this novel construction, as illustrated in Figures 1 and 10, is to transmit through the basal opening or the corresponding clear transparent panels 7, 8 or 9, a cone of rays, which have been designated as the cone of direct illumination. These rays emanate directly from the source of illumination. The second series of rays are reflected but once within the globe before they emerge from the basal opening, or the corresponding clear, transparent glass panel. These are represented by the dot and dash lines, as will be seen from Figures 1, 8 and 10, and are clearly within the cone of direct illumination.

Furthermore, the rays of light represented by the relatively long dashed lines, which are reflected twice within the globe, emerge through the basal opening or the corresponding clear, transparent panels at angles outside the cone of direct illumination. Finally, there are represented by the short dashed lines, rays of light which have been reflected three or more times, illustrating the manner in which such rays are finally reflected out through the basal opening or the corresponding clear, transparent glass panels.

Thus it is seen, that by my novel construction there are practically three kinds of lights produced. First, the light projected downwardly within the cone, and designated as the cone of direct illumination, in which cone, are included chiefly the direct rays from the source of illumination, as well as the rays which have been reflected but once within the globe, that is, the rays which carry the first or direct image of the source of light. Thus, within such cone of direct illumination, which may be varied more or less, but which, for practical purposes is maintained at about ninety degrees or forty five degrees on either side of the axis of the globe, will be the strongest and most direct and hence, the kind of rays desired from an illuminating device directly above the space to be illuminated. However, it is a well known fact, that any direct rays of light or even direct or but singly reflected images of a source of light, are more and more objectionable as the angle inclines more to the horizontal, that is, the image of a source of light placed at some distance away from the space to be illuminated.

The several operations of directing, reflecting and diffusing the light rays from a source of light as they in fact take place, can be understood from the foregoing description of the rays as shown in the several figures, and particularly from Figure 1, which illustrates the capacity of my globe for light transmission by direct rays, direct reflection, secondary reflection, multiple reflection and diffusion,—so that no further description of them is necessary.

Of course, modifications in the contour of the enclosing body may obviously be made; inasmuch, however, as that illustrated best embodies my invention and produces good results, I prefer it.

It will now be apparent that I have devised a novel and useful construction in lighting devices which embodies the features of advantage enumerated as desirable in the statement of the invention and the above description, and while I have, in the present instance, shown and described preferred embodiments thereof which will give in practice satisfactory and reliable results, it is to be understood that such embodiments are susceptible of modification in various particulars without departing from the spirit or scope of the invention or sacrificing any of its advantages.

Having thus described my invention, what I claim and desire to secure by Letters Patent, is:—

1. In an illuminating device of the character stated, the combination of a source of light and a globe including an upper reflecting wall of diffusing glass and a side reflecting wall; said globe being adapted to transmit light freely below the diffusing body, and the angle between the top wall and side wall being so related to the source of light and the lower edge of the diffusing body, as to eliminate any first reflection of the source of light above the cone of direct illumination.

2. In an illuminating device of the character stated, the combination of a source of light and a globe having a body of diffusing glass comprising an upper reflecting wall and a side reflecting wall and a basal opening for the direct transmission of light, and the angle between the top wall and the side wall being so related to the source of light and the edge of said basal opening, as to eliminate any first reflection of the source of light above the cone of direct illumination.

3. In an illuminating device of the character stated, a globe comprising an upper reflecting wall of diffusing glass, a side reflecting wall of diffusing glass, and a bottom wall of diffusing glass, and a basal opening in said bottom wall for the direct transmission of light from within said globe; and the angles between the walls of said globe being so related to the edge of said basal opening as to eliminate any first reflection above the cone of direct illumination, of a source of light suitably positioned within said globe.

4. In an illuminating device of the character stated, the combination of a source of light and a globe having a body of diffusing glass, comprising an upper reflecting wall, a side reflecting wall, and a bottom reflecting wall, said globe being adapted to transmit light freely below said diffusing body, and the angles between said walls being so related to the source of light and the lower edge of said diffusing body as to eliminate any first reflection of the source of light, above the cone of direct illumination.

HENRY D'OLIER, Jr.